Oct. 30, 1934.  H. PAXTON  1,978,504
CRATE CENTERING DEVICE FOR LIDDERS
Filed June 13, 1932   3 Sheets-Sheet 1
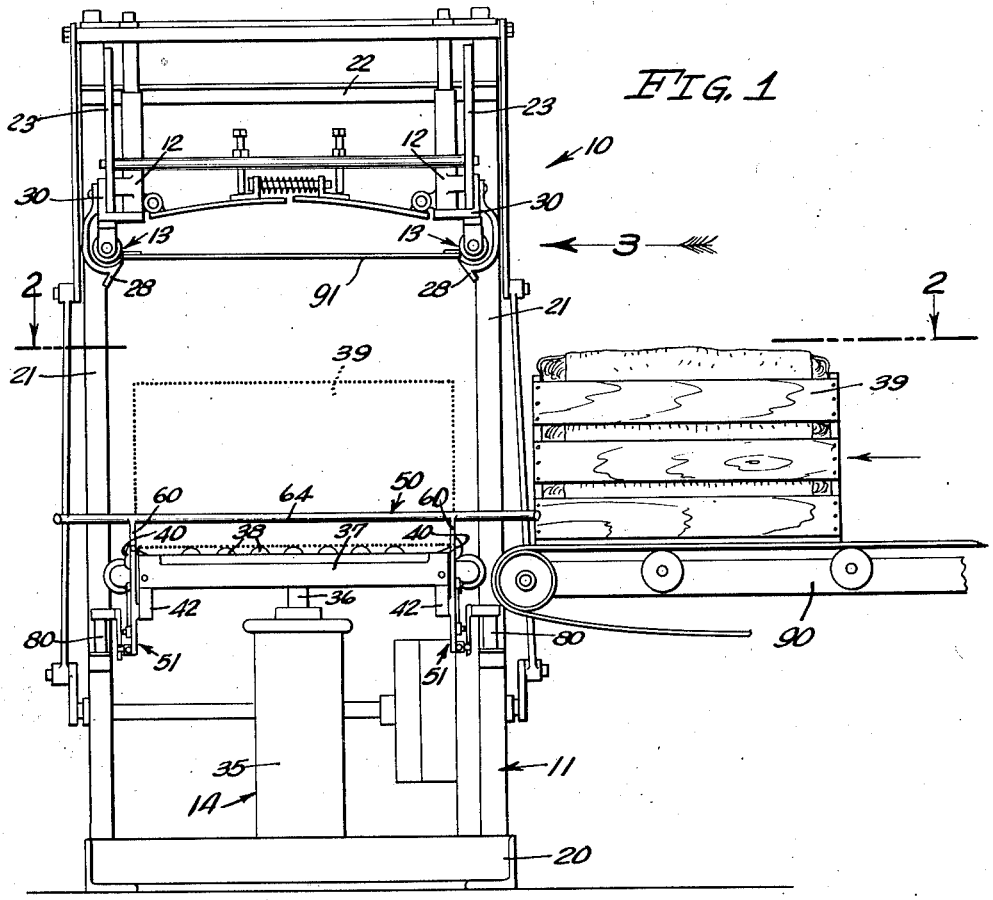
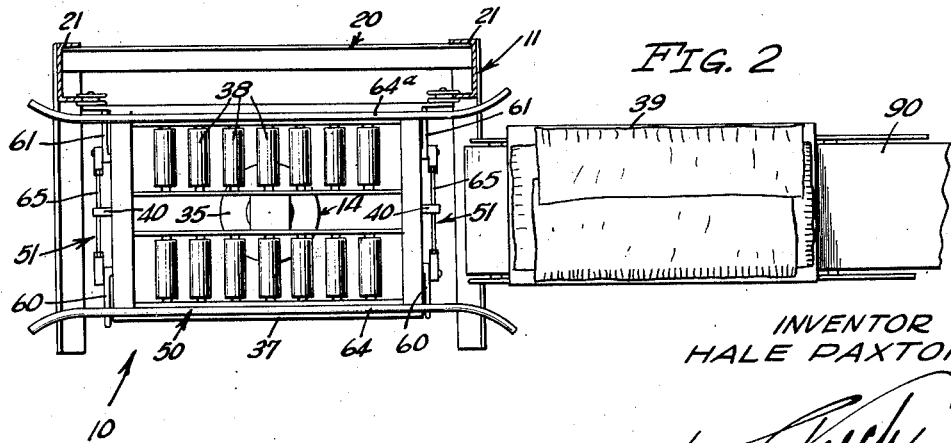
INVENTOR
HALE PAXTON
BY
ATTORNEY Oct. 30, 1934.  H. PAXTON  1,978,504
CRATE CENTERING DEVICE FOR LIDDERS
Filed June 13, 1932   3 Sheets-Sheet 2
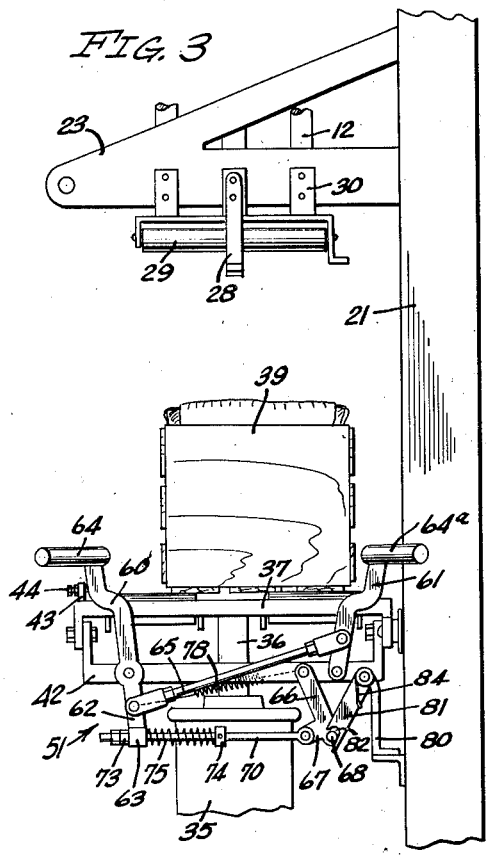
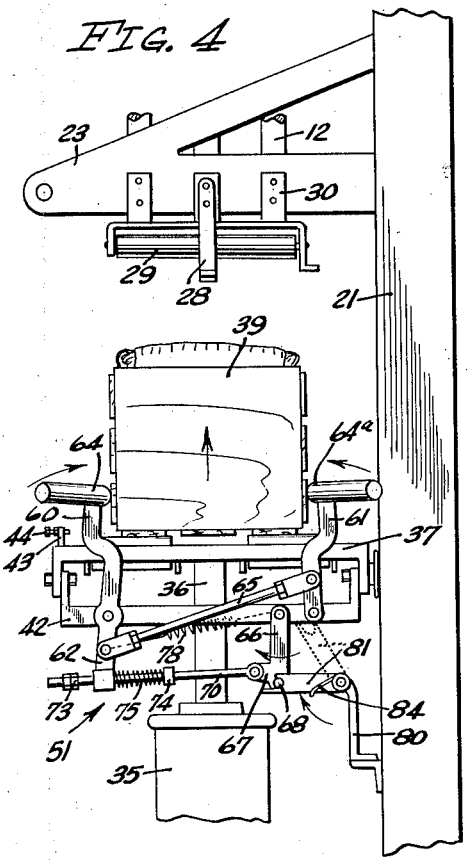
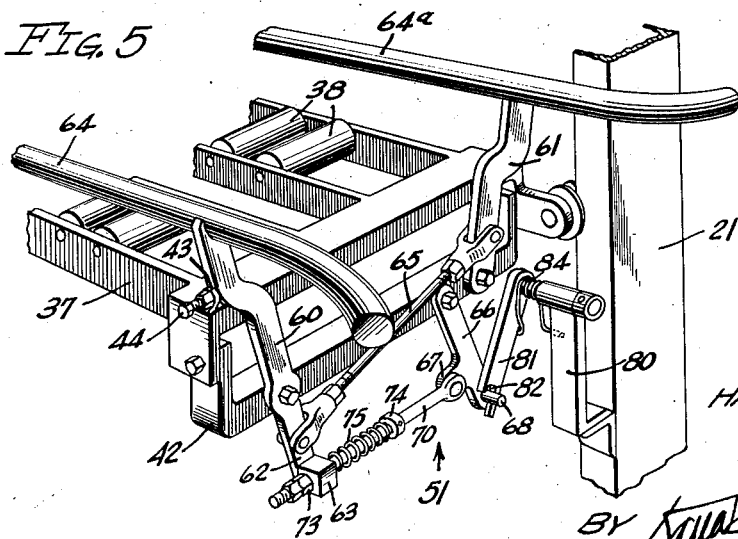
INVENTOR
HALE PAXTON
BY
ATTORNEY Oct. 30, 1934.   H. PAXTON   1,978,504
CRATE CENTERING DEVICE FOR LIDDERS
Filed June 13, 1932   3 Sheets-Sheet 3
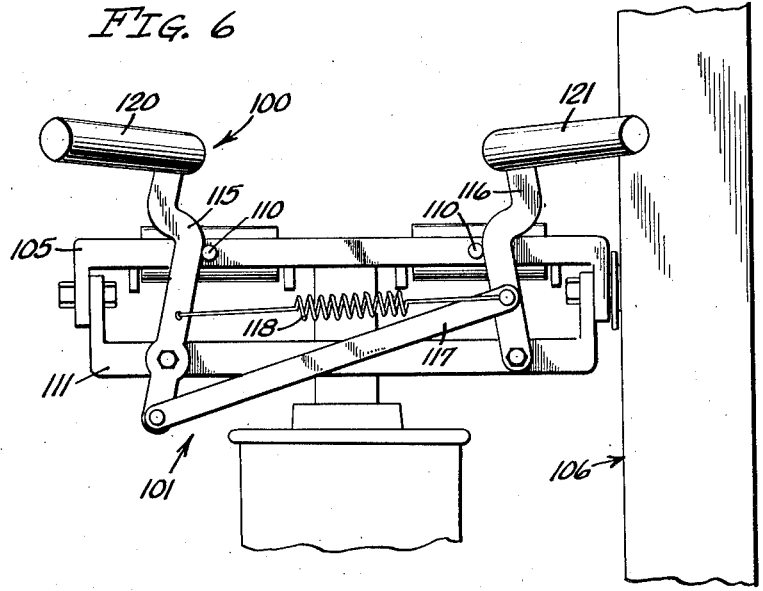
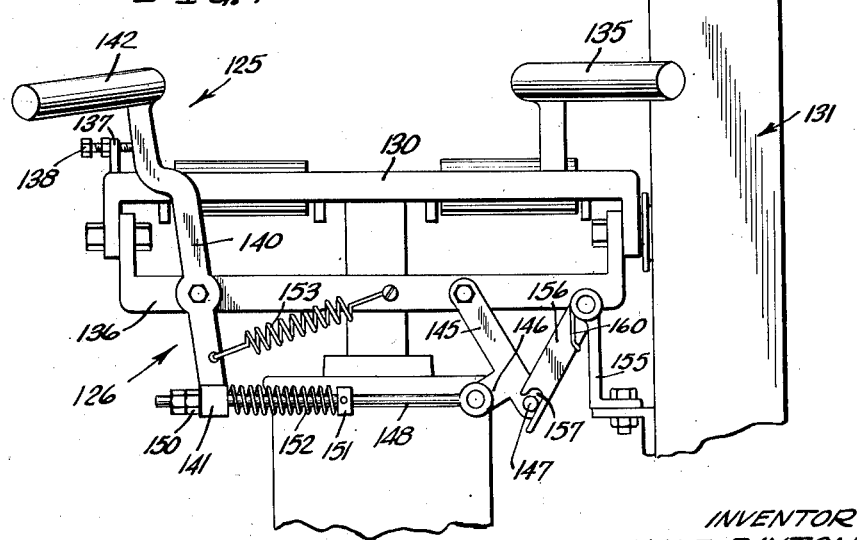
INVENTOR
HALE PAXTON
ATTORNEY Patented Oct. 30, 1934

1,978,504

UNITED STATES PATENT OFFICE 1,978,504

CRATE CENTERING DEVICE FOR LIDDERS

Hale Paxton, Redlands, Calif., assignor to Paxton Credit Corporation, Sanger, Calif., a corporation of California Application June 13, 1932, Serial No. 616,933

6 Claims. (Cl. 1—10)

My invention relates to crate or box lidding machines and is particularly useful in machines which are adapted to apply lids to crates or boxes of varying widths.

In the packing of certain agricultural products for shipment different sized crates are used for the different fruits and vegetables, these crates usually being approximately equal in length and variable in width and height. It is common practice to use the same sized lid for the different crates when the crates are equal in length and do not vary greatly in width. When certain fruits or vegetables are in season at the same time it is often necessary for one packing house to pack several varieties of produce simultaneously, and the various sized crates must be segregated for the lidding operation as the lidding machines are usually adjusted to receive a crate of a certain width and the machines must be readjusted for crates of different sizes.

An object of my invention is to provide a suitable mechanism for a lidding machine which will enable the machine to receive crates or boxes of varying widths and automatically align such crates or boxes in proper lidding position relative to the lid.

Further objects and advantages will be made manifest in the following description taken in connection with the accompanying drawings, in which:

Fig. 1 is a front elevational view of a crate lidding machine illustrating a preferred embodiment of my invention.

Fig. 2 is a horizontal sectional view taken on line 2—2 of Fig. 1.

Fig. 3 is a fragmentary side elevational view of the machine shown in Fig. 1.

Fig. 4 is a view similar to Fig. 3 illustrating the operation of the mechanism disclosed therein.

Fig. 5 is a fragmentary perspective view of a portion of the mechanism shown in Figs. 3 and 4.

Fig. 6 is a fragmentary elevational view of a portion of a modified form of my invention.

Fig. 7 is a fragmentary elevational view of a portion of a second modified form of my invention.

Referring specifically to the drawings, the preferred embodiment of the invention shown in Figs. 1 to 5 inclusive is incorporated with a lidding machine 10, this machine including a frame 11, nailing chucks 12, lid supporting and aligning mechanisms 13, and an elevator 14.

The frame 11 includes a base 20, vertical side standards 21, a transverse member 22, and brackets 23 which are secured to the upper ends of the standards 21. The nailing chucks 12 are secured to the brackets 23, as shown in Figs. 1 and 3. The lid supporting and aligning mechanisms 13, shown clearly in Fig. 1, include a pair of yieldable lid supporting fingers 28 and a pair of crate aligning rollers 29, these being suitably mounted on brackets 30 which are secured to the larger brackets 23.

The elevator 14 includes a hydraulic cylinder 35 which has a piston rod 36, to the upper end of which is mounted a box supporting platform 37, this being slidable vertically in the frame 11. The platform 37 has idle rollers 38 upon which a packed crate 39 is adapted to be rolled, automatic stops 40 being provided at opposite ends of the platform to position the crate in proper longitudinal relation to the platform.

A more detailed description of the lidding machine 10 can be found in my copending application for U. S. Letters Patent, Serial No. 587,388, filed January 18, 1932.

Hung below opposite ends of the platform 37 are horizontal bars 42 and provided on the top of the platform at opposite ends thereof are lugs 43 which receive threaded stop screws 44, the purpose of which will be made evident hereinafter.

Crates which vary in width are adapted to be centered upon the platform 37 by an automatic crate centering apparatus 50. This apparatus includes a pair of mechanisms 51, one of which is mounted at each end of the platform 37 on one of the bars 42.

Each of the mechanisms 51 includes a pair of arms 60 and 61 which are pivotally mounted on the bar 42, the arm 60 having a downward extension 62, on the lower end of which a bored block 63 is pivotally mounted. Secured to the upper ends of the arms 60 and 61 of each of the two mechanisms 51 are guide rails 64 and 64a which are curved at their ends, as shown in Figs. 2 and 5. The arms 60 and 61 are connected by diagonal tie rods 65, as shown in Fig. 5, so that they swing inwardly and outwardly in unison. Pivoted on the bar 42 at a point close to the fulcrum of the arm 61 is a depending arm 66 which is provided at its lower end with an ear 67 and a pin 68. Pivoted to the ear 67 is a link 70 which is slidably received by the block 63. The link 70 has a nut 73 and a collar 74 disposed at opposite sides of the block 63, a compression spring 75 being positioned between the collar 74 and the block 63. The arms 60 are urged against the stop screws 44 of the platform 37 by contractile springs 78 which are suspended from the extensions 62 of the arms 60 to the pivot points of the arms 66. Pivotally mounted on each of the standards 13 of the frame 110

11 by means of brackets 80 is an arm 81 which is provided with a recess 82 at one end thereof, and is positioned so that the recess 82 normally engages the pin 68 of one of the arms 66, the arm 81 being urged against this pin 68 by a torsion spring 84, as shown in Fig. 5. The spring 84 is wound so that its tension is expended when the arm 81 is disposed in the horizontal position shown in solid lines in Fig. 4.

Operation

When the platform 37 is at rest at its lowermost position it is disposed in horizontal alignment with a crate feeding conveyor 90 as shown in Fig. 1, and the crate centering mechanism 50 is in position, as shown in Figs. 3 and 5, it being noted that the rails 64 and 64a are swung outwardly and that the arms 60 are in contact with the stop screws 44. The crate 39 is fed onto the platform 37 by the conveyor 90 and the automatic stops 40 function to center the crate longitudinally with the platform 37, as shown by dotted lines in Fig. 1. The elevator 14 is now operated to lift the crate 39 into lidding position. As the platform 37 is raised by the hydraulic cylinder 35, the arm 81 is swung upwardly by the pin 68 of the arm 66, as shown in Fig. 4. This movement of the arm 81 forces the arm 66 in the direction of the arrow in Fig. 4 and the link 70 yieldably urges the arms 60 and 61 inwardly until the guide rails 64 and 64a contact the sides of the crate 39, thus centering the crate transversely with the platform 37, as shown in Fig. 4. As the platform continues upwardly from the position shown in Fig. 4, the arm 81 is carried to the dotted line position shown in Fig. 4, and the mechanism 51 returns to its normal position leaving the crate 39 in vertical alignment with the lid supporting and aligning mechanisms 13. Further upward movement of the platform 37 raises the pin 68 of the arm 66 out of the recess in the end of the arm 81 and the arm 81 gravitates to a horizontal position where it is supported by the torsion spring 84. The crate 39 is finally carried upwardly into contact with a lid 91, shown in Fig. 1, the lid being nailed to the crate by the nailing mechanism 12 in a conventional manner by nails driven from the nail chucks 12.

After the lid is applied to the crate the platform moves downwardly to its normal position, as shown in Fig. 3, it being noted that the arm 81 is depressed by the pin 68 of the arm 66, and that the pin 68 is again disposed within the recess 82 of the arm 81.

Referring particularly to Fig. 6, I have shown therein a modified form of automatic crate centering mechanism 100 which includes a pair of mechanism units 101 which are mounted on opposite ends of a platform 105 of a crate lidding machine 106, the machine 106 being identical with the aforedescribed machine 10. Provided at opposite ends of the platform 105 are pairs of stop pins 110 and horizontal bars 111, the bars 111 being identical with the bars 42 hereinabove described. As the units 101 are identical in structure and operation only one of the units is shown and described.

Pivotally mounted on one of the bars 111 is a pair of arms 115 and 116 which are caused to move inwardly and outwardly in unison by a tie rod 117 which is connected to the arms as shown. The arms 115 and 116 are normally urged into contact with the stop pins 110 by a contractile spring 118. Secured to the upper ends of the arms 115 and 116 of each of the units 101 are guide rails 120 and 121 which are identical with the rails 64 and 64a shown in Figs. 1 to 5 inclusive.

The operation of the crate centering mechanism 100 is as follows: As a crate (not shown) is fed onto the platform 105 of the lidding machine 106 the rails 120 and 121 are forced outwardly by the crate which is thereby centered transversely with respect to the platform 105. It is clear that crates of varying widths will be centered by the mechanism 100 as the rails 120 and 121 are at all times equidistant from the longitudinal axis of the platform 105. After a crate is lidded by the machine 106 and removed from the platform 105, the rails 120 and 121 are urged to their normal position, shown in Fig. 6, by the springs 118 at opposite ends of the platform 105.

Referring particularly to Fig. 7, I have shown therein a second modified form of my invention having a crate centering mechanism 125 which includes a pair of units 126, one of which is mounted on opposite ends of a platform 130 of a crate lidding machine 131 and which is identical with the aforedescribed machine 10. Mounted above the platform 130 adjacent the rear edge thereof is a stationary guide rail 135 which is similar to the rail 64a shown in Figs. 1 to 5. Secured to the platform 130 at opposite ends thereof are horizontal bars 136 and lugs 137, the latter receiving stop screws 138. The bars 136 and lugs 137 are identical with the bars 42 and lugs 43, respectively, of the preferred embodiment of my invention shown in Figs. 1 to 5.

Each unit 126 has an arm 140 which is pivotally mounted on the bar 136 and has a bored block 141 pivotally mounted on the lower end thereof. Secured to the upper ends of the arms 140 of the units 126 is a movable guide rail 142. Also pivotally mounted on the bar 136 is a depending arm 145 which has an ear 146 and a pin 147 at the lower end thereof. Pinned to the ear 146 is a link 148 which is slidably received by the block 141, this link being provided with a nut 150, a collar 151, and a compression spring 152 as shown. The arm 140 is urged against the stop screw 138 by an extension spring 153 which is fastened at the opposite ends thereof to the bar 136 and the arm 140.

Pivotally mounted on the frame of the lidding machine 131 by means of a bracket 155 is an arm 156 which has a recess 157 at one end thereof. The pin 147 of the arm 145 is normally received by the recess 157 of the arm 156 and the arm 156 is urged against this pin by a torsion spring 160. The construction and operation of the crate centering mechanism 125 is identical with that of the mechanism 50, shown in Figs. 1 to 5, with the exception that only the rail 142 is movable, the rail 135 being stationary.

The mechanism 125 is adapted to center crates on the platform 130 which do not vary greatly in width.

What I claim is:

1. In a lidding machine the combination of: a frame; box supporting means on said frame; lid positioning means mounted on said frame over said box supporting means; means for moving one of the aforesaid means vertically towards the other to position a lid on a box; box guide means provided on said supporting means; and spring means actuated by said vertical moving means for automatically moving said box guide means horizontally towards said box after said box has been entirely received by and is at rest on said box supporting means for shifting said box transversely of its longitudinal axis to bring said axis into vertical alignment with the longitudinal axis of said lid.

2. In a lidding machine the combination of: a frame; box supporting means on said frame, said means being adapted to receive a rectangular box travelling horizontally in the direction of its longitudinal axis with a substantial degree of lateral play; nailing means on said frame; lid positioning means mounted on said frame over said box supporting means, said lid positioning means being adapted to support a rectangular lid by its opposite ends on a fixed longitudinal axis with the ends of said lid beneath said nailing means; means on said box supporting means for automatically engaging a box after it has been received by and come to rest on said box supporting means for shifting said box transversely of the longitudinal axis thereof to bring the longitudinal axis of said box into vertical alignment with the longitudinal axis of said lid; means for lifting said box supporting means to apply said lid to said box in readiness for nailing thereto; and means actuated by said lifting means to effect the operation of said automatic box shifting means.

3. In a lidding machine the combination of: a nailing table to receive and support any one of a plurality of crates of substantially different widths; means for supporting a lid of a given width over said nailing table in centralized relation with said table relative to its longitudinal axis; means to bring said lid supporting means and said table together vertically to permit nailing of said lid to said crate; a pair of guide rails adapted to guide any one of said crates onto said nailing table, said rails being movable toward and away from each other; means interconnecting said rails to equalize the movement thereof to maintain them at equal distances from the longitudinal axis of said table; and means to yieldably move said rails toward each other into contact with opposite sides of any one of said crates to position said crate in centralized relation relative to the longitudinal axis of said lid.

4. In a lidding machine, the combination of: nailing table means to receive and support any one of a plurality of crates of substantially different widths; means for supporting a lid over said nailing table in centralized relation with said table; means to bring said lid supporting means and said table together vertically to permit nailing of said lid to said crate; and means to engage and shift any one of said crates to centralized relation with said table in response to the initial stage of relative vertical movement of said table and said lid supporting means, said engaging and shifting means releasing said crate during the final stage of said relative vertical movement.

5. In a lidding machine, the combination of: nailing table means to receive and support any one of a plurality of crates of substantially different widths; means for supporting a lid over said nailing table in centralized relation with said table; means to bring said lid supporting means and said table together vertically to permit nailing of said lid to said crate; means to shift any one of said crates to centralized relation with said table; and means to yieldably actuate said crate shifting means in response to said relative vertical movement of said table and said lid supporting means.

6. In a lidding machine the combination of: nailing table means to receive and support any one of a plurality of crates of substantially different widths; means for supporting a lid over said nailing table in centralized relation with said table; means to bring said lid supporting means and said table together vertically to permit nailing of said lid to said crate; a pair of guide rails movable toward and away from each other, said rails being bent outward at their ends to adapt them to guide any one of said crates onto said nailing table; spring means urging said rails toward each other; and means interconnecting said rails to positively equalize the movement thereof so as to maintain said rails at equal distances from the longitudinal axis of said table.

HALE PAXTON.